United States Patent
Gong et al.

(10) Patent No.: US 8,687,011 B2
(45) Date of Patent: Apr. 1, 2014

(54) TECHNIQUES FOR EFFICIENT SAMPLING FOR IMAGE EFFECTS

(75) Inventors: Minmin Gong, Beijing (CN); Sergei Shinkevich, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 12/914,268

(22) Filed: Oct. 28, 2010

(65) Prior Publication Data

US 2012/0105465 A1     May 3, 2012

(51) Int. Cl.
*G09G 5/00*     (2006.01)

(52) U.S. Cl.
USPC ........... 345/587; 345/581; 345/582; 345/589; 345/606; 345/611; 345/614; 382/260; 382/264

(58) Field of Classification Search
None
See application file for complete search history.

(56) References Cited

U.S. PATENT DOCUMENTS

| 7,324,116 B2 * | 1/2008 | Boyd et al. ............... 345/582 |
| 7,355,604 B2 * | 4/2008 | Bando et al. ............. 345/582 |
| 7,397,964 B2 | 7/2008 | Brunner |
| 7,477,802 B2 | 1/2009 | Milanfar |
| 2005/0232507 A1 | 10/2005 | Zimmer |
| 2007/0223831 A1 | 9/2007 | Mei |

OTHER PUBLICATIONS

Lowe, David G., "Distinctive Image Features from Scale-Invariant Keypoints", International Journal of Computer Vision, 28 pages, published 2004.
Hart, Evan, "GPU Christmas Tree Rendering", 10 pages, published Feb. 2007.
Lopez, Miguel Bordallo et al., "Graphics hardware accelerated panorama builder for mobile phones", Multimedia on Mobile Devices 2009, Proceedings of SPIE-IS&T Electronic Imaging, SPIE vol. 7256, 9 pages, published 2009.
Chiang, Ming-Chao et al., "Local Blur Estimation and Super-Resolution", IEEE, pp. 821-826, published 1997.
Strengert, Magnus et al., "Pyramid Methods in GPU-Based Image Processing", Institute for Visualization and Interactive Systems, retrieved Jul. 2010, 9 pages.

* cited by examiner

*Primary Examiner* — Antonio A Caschera
(74) *Attorney, Agent, or Firm* — Sung Kim; Andrew Sanders; Micky Minhas

(57) ABSTRACT

Techniques to sample texels efficiently for an image effect may include determining a number of texels (kernel size) needed to compute a weighted average for an image effect on an image. The technique may further include selecting at least one mipmap generated by a graphics processing unit (GPU) according to a function of the determined kernel size. The function may also consider a threshold kernel size. The technique may further sampling texels, with the GPU, from the selected mipmap(s), and calculate the weighted average of the sampled texels to produce the image effect.

17 Claims, 6 Drawing Sheets

300

DETERMINE A NUMBER OF TEXELS (KERNEL SIZE) NEEDED TO COMPUTE A WEIGHTED AVERAGE FOR AN IMAGE EFFECT ON AN IMAGE
302

SELECT AT LEAST ONE MIPMAP GENERATED BY A GRAPHICS PROCESSING UNIT (GPU) ACCORDING TO A FUNCTION OF THE DETERMINED KERNEL SIZE
304

SAMPLE TEXELS FROM THE SELECTED AT LEAST ONE MIPMAP USING THE GPU
306

CALCULATE THE WEIGHTED AVERAGE FROM THE SAMPLED TEXELS
308

APPLY THE IMAGE EFFECT USING THE WEIGHTED AVERAGE
310

TECHNIQUES FOR EFFICIENT SAMPLING FOR IMAGE EFFECTS

BACKGROUND

Some image effects that may be applied to images or textures become computationally intensive as the area of the effect increases. The situation may be exacerbated when the size of the area changes over time. For some image effects, such as a Gaussian blur, when the radius of the blur increases, the number of texels that must be sampled and averaged increases.

It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to sample texels efficiently for an image effect. Some embodiments are particularly directed to techniques to sample texels efficiently for an image effect using the capabilities of a graphics processing unit. In one embodiment, for example, the technique may comprise determining a number of texels (kernel size) needed to compute a weighted average for an image effect on an image; selecting at least one mipmap generated by a graphics processing unit (GPU) according to a function of the determined kernel size; sampling texels, with the GPU, from the selected mipmap(s); and calculating the weighted average of the sampled texels. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 3 illustrates an embodiment of a logic flow.

DETAILED DESCRIPTION

Various embodiments are directed to techniques for efficient sampling from an image to produce image effects, such as Gaussian filtering, or other convolution filers and effects that use averaging among pixels or texels in an image. Embodiments may improve efficiency, in particular, when the radius of the image effect is large, e.g. greater than a few texels, and/or when the output of the image effect must change continuously with a radius that changes in small increments. Embodiments may take advantage of the mipmap and sampling capabilities of a graphics processing unit to efficiently sample texels in an image, particularly when a large sample size is needed due to the larger radius.

Figure 1:
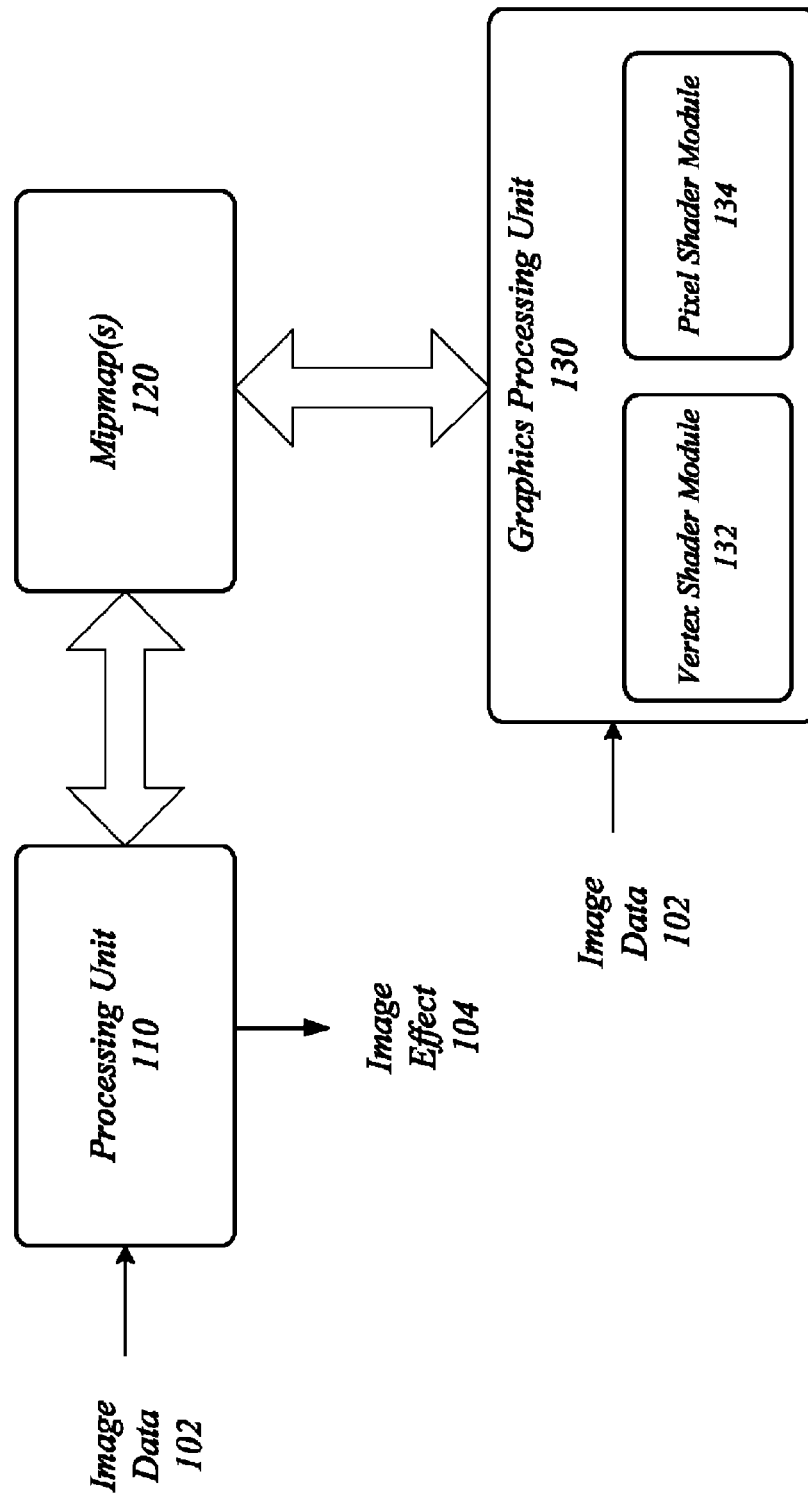
FIG. 1 illustrates an embodiment of a system.

FIG. 1 illustrates a block diagram for a system 100 to efficiently sample texels from an image for an image effect. In one embodiment, for example, the system 100 may comprise a computer-implemented system 100 having multiple components such as processing unit 110 and graphics processing unit (GPU) 130 (collectively, "the components 110, 130"). As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, game console, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise processing unit 110. Processing unit 110 may comprise one or more processors, such as a central processing unit (CPU), modules, and/or instructions to perform the techniques discussed herein. Processing unit 110 may receive image data 102 and produce an image effect 104. Image data 102 may include, for example, still images in various formats, or individual images from a video sequence.

Image effect 104 may include, without limitation, a Gaussian blur, a box blur, convolution filters that average pixels or texels, separable filters that operate independently on two dimensions, or non-separable filters. The discussion that follows focuses primarily on Gaussian blur as an example, but embodiments are in no way limited to only Gaussian blur.

Gaussian blur smoothes sharp details in an image by filtering out high frequencies and keeping low frequencies. A Gaussian blur may be computed by two one-dimensional passes where only (two times the Gaussian kernel) weighting multiplications and additions for each output texel is needed. A Gaussian blur kernel may be large with a filter that is computationally intensive. The number of texels that are to be averaged when performing a Gaussian blur is proportional to the kernel size, more particularly, to the standard deviation of the Gaussian distribution; therefore, the amount of time required to perform a Gaussian blur increases as the kernel increases.

In various embodiments, the system 100 may comprise graphics processing unit (GPU) 130. In an embodiment, GPU 130 comprises vertex shader module 132 and pixel shader module 134, which are both considered common units in GPUs. In an embodiment, vertex shader module 132 may operate to scale location along with the subsequent rasterization; therefore, the process of scaling an image down is performed with great quality and efficiency. In an embodiment, pixel shader module 134 may operate to change the individual dots within a texel. In an embodiment, the radius of a blur is measured in texels. Additional features of GPU 130 are described in commonly—owned patent publication no. 2007/0183683, which is incorporated herein by reference.

GPU 130 is capable of creating mipmaps 120 from image data 102. Mipmaps 120 are scaled versions, typically bitmaps, of an original image. Each mipmap 120 is a version of the main image, but at a certain reduced level of detail. Typically mipmaps 120 are produced at a fractional power of two scale of the original image, for example, ½, ¼, ⅛, etc. In some embodiments, each mipmap level is ¼ of the previous level. Mipmaps 120 are discussed further below with respect to FIG. 2. Processing unit 110 may use mipmaps 120 and other outputs from GPU 130 in producing image effect 104, as will be discussed further below.

Figure 2:
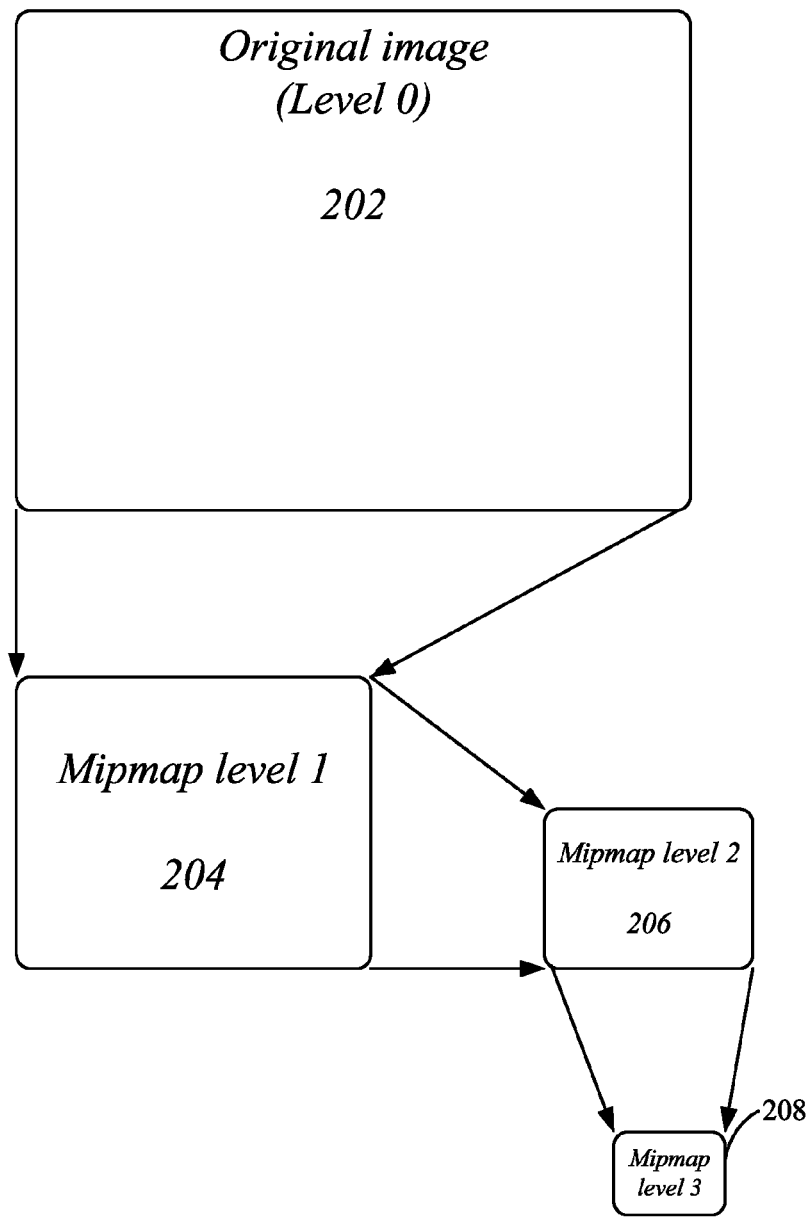
FIG. 2 illustrates an embodiment of a set of mipmaps.

FIG. 2 illustrates a block diagram of an example of a set of mipmaps 200 generated from an original image 202, for example, by GPU 130. Mipmap level 1 (204) may be ¼ the size and resolution of original image 202. Mipmap level 2 (206) may be ¼ the size and resolution of mipmap level 1 (204), and 1/16 the size and resolution of original image 202. Mipmap level 3 (208) may be ¼ the size and resolution of mipmap level 3, and may be 1/32 the size and resolution of original image 202. Additional mipmap levels may exist. Alternate scaling fractions may also be used. The embodiments are not limited to these examples.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 3 illustrates one embodiment of a logic flow 300. The logic flow 300 may be representative of some or all of the operations executed by one or more embodiments described herein.

In the illustrated embodiment shown in FIG. 3, the logic flow 300 may determine a number of texels, also referred to herein as a kernel size, needed to compute a weighted average for an image effect at block 302. For example, processing unit 110 may receive a selection from a user or from a rendering software application of a radius size for the image effect and may determine the number of texels based on the radius size. For a Gaussian blur, the kernel size may be selected to be a multiplier of the standard deviation of the Gaussian distribution. The multiplier may be selected according to whether a higher precision or better performance is preferred. In an embodiment, the multiplier may be about three.

The logic flow 300 may select at least one mipmap generated by a GPU according to a function of the determined kernel size at block 304. For example, processing unit 110 may use a function that maps a mipmap level to a kernel size, and may use the kernel size to calculate a mipmap level. Then processing unit 110 may request the selected mipmap from GPU 130. If the mipmap for that level does not yet exist, then GPU 130 may generate it. In the event that the function does not map directly to a specific mipmap level, a second mipmap may also be selected, as is discussed further with respect to FIG. 4.

The logic flow 300 may sample texels from the selected mipmap(s) using the GPU at block 306. For example, processing unit 110 may request a sample from GPU 130 for the mipmap level selected.

The logic flow 300 may calculate the weighted average from the sampled texels at block 308. For example, the GPU may calculate the weighted average. In an embodiment, the sampling and weighted average may be performed in response to a single GPU instruction, and may combine blocks 306 and 308.

A Gaussian blur is, in effect, a weighted sum of texels. The GPU may decrease the number of operation needed to produce the sampling and weighted average as follows. Since the texels may be stored near each other, a hardware texture filtering unit (not shown) in the GPU may be used to advantage. For example, take two texels t0 and t1, which have the addresses x0 and x0+1, and weights w0 and w1, respectively. Their weighted sum may be determined by (t0*w0)+(t1*w1). Instead of sampling the addresses x0 and x0+1, the GPU may sample the address x0+1−w0/(w0+w1) with the weight w0+w1. This also gets the correct result: lerp(t0, t1, 1−w0/(w0+w1))*(w0+w1)=t0*w0+t1*w1, where "lerp" is a linear interpolation provided by GPU hardware. In this way, the two texture sampling is reduced to only one texture sampling.

The logic flow 300 may apply the image effect using the weighted average at block 310. In an embodiment, the effect, e.g. a Gaussian blur, may be performed by processing unit 110 or by GPU 130. In an embodiment, the effect may be output to a texture of any resolution, including the resolution of the original image. In such an embodiment, no separate scaling up step may be required. The saved texture may be input for further processing or may be displayed. For separable filter operations, the output of a first step may be input into the next step.

In an embodiment, the logic flow 300 may be repeated for a changing kernel size. Changing the kernel size may allow the creation of a transition effect, such as changing from a first image to a second image. The kernel size may be increased on the first image, rendering the image blurrier, then the kernel size may begin large and be decreased on the second image.

Figure 4:
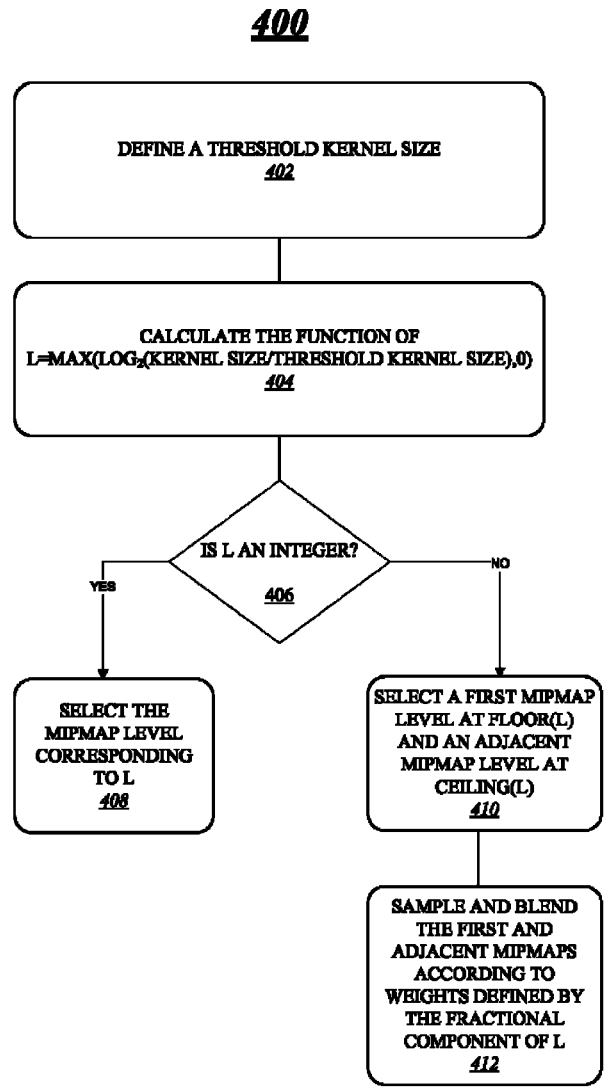
FIG. 4 illustrates an embodiment of a logic flow.

FIG. 4 illustrates one embodiment of a logic flow 400 describing an embodiment of block 304 of logic flow 300. The logic flow 400 may be representative of some or all of the operations executed by one or more embodiments described herein.

In the illustrated embodiment shown in FIG. 4, the logic flow 400 may define a threshold kernel size in block 402. The threshold kernel size may be a number of texels above which mipmap sampling as described in FIG. 3 will actually take place. If the kernel size determined from block 302 is at or below the threshold kernel size, then processing unit 110 may sample directly from the original image. Otherwise, mipmap sampling may occur as described below.

In the illustrated embodiment shown in FIG. 4, the logic flow 400 may calculate the function (L) of the determined kernel size from block 302 in relation to the threshold kernel size in block 404. In an embodiment, L may be a continuous function of kernel size that increases by one as the kernel size increases by two. For example, $$L = \max(\log_2(\text{determined kernel size/threshold kernel size}), 0). \quad (1)$$

If the mipmap levels relate to each other in a way that is not ¼, then other relationships between L and the kernel size may be used. In equation (1), the mipmap levels change by one for two down-scalings.

In the illustrated embodiment shown in FIG. 4, the logic flow 400 may check whether L is an integer or not, in block 406.

If L is an integer, then the logic flow 400 may select the mipmap level that corresponds to L in block 408. If L=0, then mipmap level 0, which is the original image, may be used.

If L is not an integer, for example, L=1.7, then in block 410, the logic flow 400 may select a first mipmap that corresponds to $L_1$=floor(L), e.g. $L_1$=1. The logic flow 400 may also select a second mipmap, adjacent to $L_1$, that corresponds to $L_2$=ceiling(L), e.g. $L_2$=2.

In the illustrated embodiment shown in FIG. 4, the logic flow 400 may sample and blend $L_1$ and $L_2$ in block 412. The two mipmap levels may be blended according to their respective fractional component from L. In this example, $L_1$ receives a 30% weight, while $L_2$ receives a 70% weight. The sampling and blending from two adjacent mipmaps may be performed by GPU 130, for example, by pixel shader module 134. In an embodiment, the sampling and blending may be performed with a single GPU instruction, for example, the tex2Dbias ( ) instruction in DirectX version 9 GPU instruction set and minimal shader model 2.0.

Figure 5:
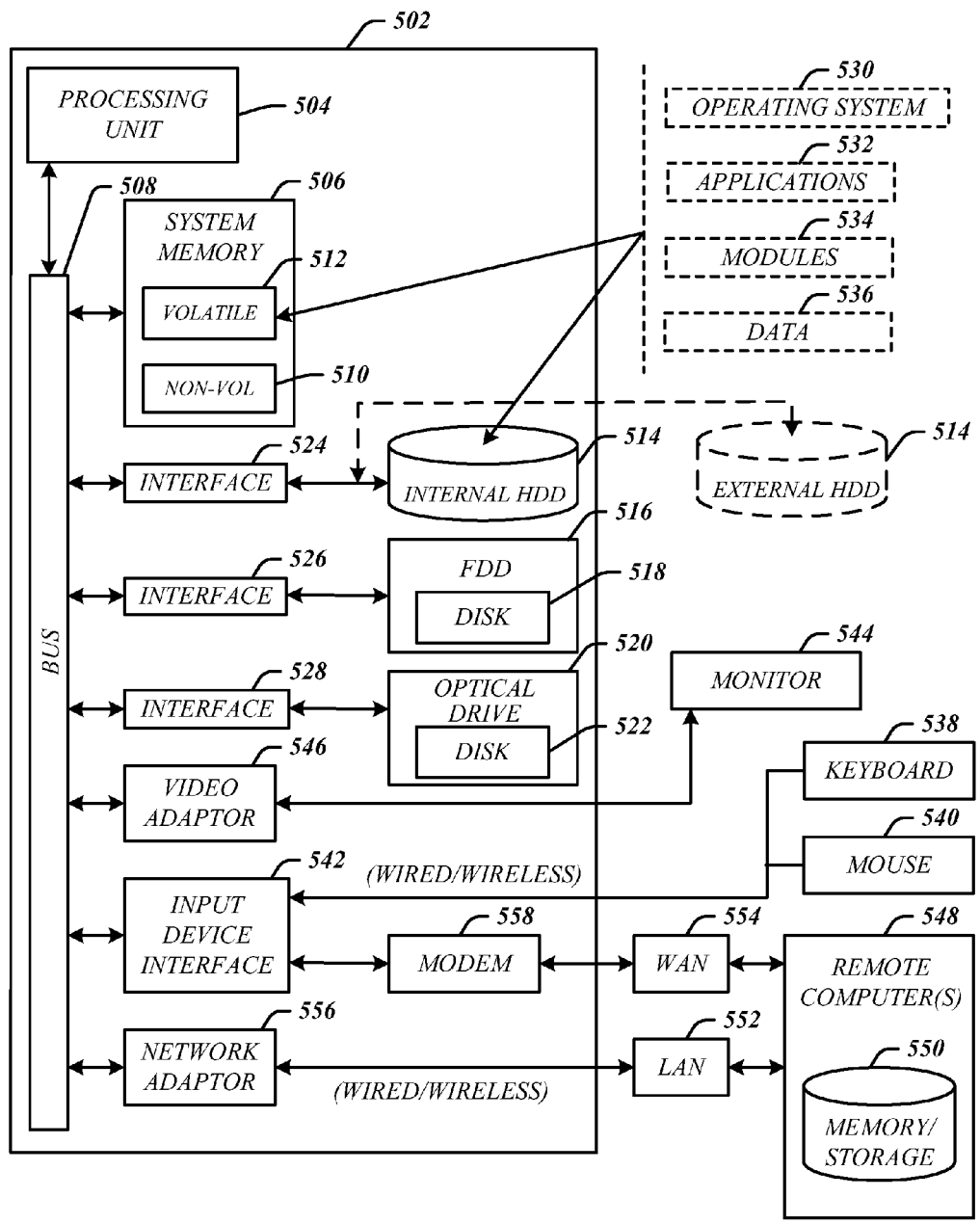
FIG. 5 illustrates an embodiment of a computing architecture.

FIG. 5 illustrates an embodiment of an exemplary computing architecture 500 suitable for implementing various embodiments as previously described. The computing architecture 500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors. Dual microprocessors and other multi-processor architectures may also be employed as the processing unit 504. The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures.

The system memory 506 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media, including an internal hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. The one or more application programs 532, other program modules 534, and program data 536 can include, for example, the image effect instructions.

A user can enter commands and information into the computer 502 through one or more wire/wireless input devices, for example, a keyboard 538 and a pointing device, such as a mouse 540. Other input devices may include a microphone, an infra-red (IR) remote control, a joystick, a game pad, a stylus pen, touch screen, or the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
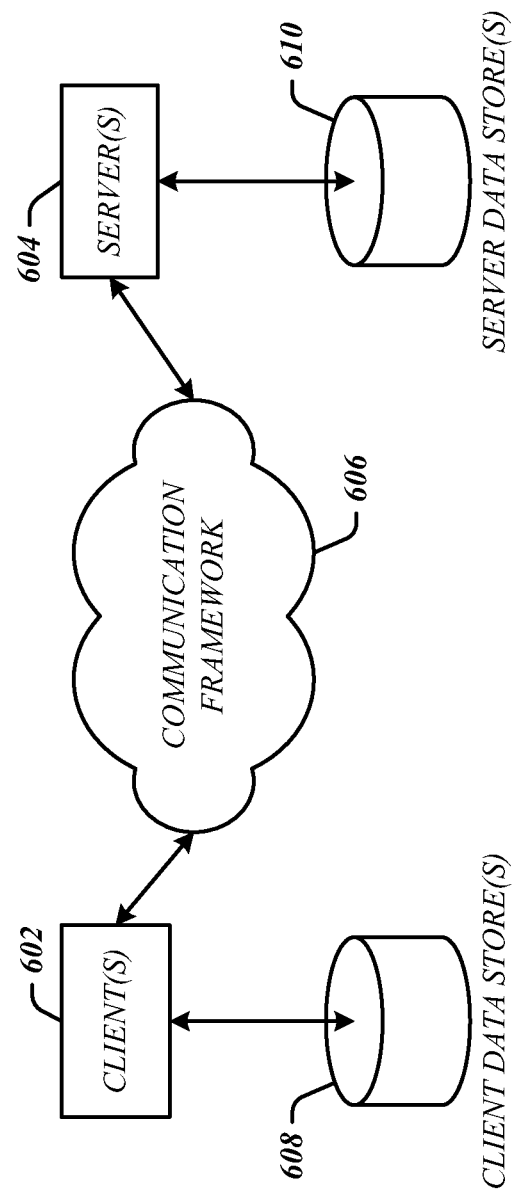
FIG. 6 illustrates an embodiment of a communications architecture.

FIG. 6 illustrates a block diagram of an exemplary communications architecture 600 suitable for implementing various embodiments as previously described. The communications architecture 600 includes various common communications elements, such as a transmitter, receiver, transceiver, radio, network interface, baseband processor, antenna, amplifiers, filters, and so forth. The embodiments, however, are not limited to implementation by the communications architecture 600.

As shown in FIG. 6, the communications architecture 600 comprises includes one or more clients 602 and servers 604. The clients 602 and the servers 604 are operatively connected to one or more respective client data stores 608 and server data stores 610 that can be employed to store information local to the respective clients 602 and servers 604, such as cookies and/or associated contextual information.

The clients 602 and the servers 604 may communicate information between each other using a communication framework 606. The communications framework 606 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 602 and the servers 604 may include various types of standard communication elements designed to be interoperable with the communications framework 606, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 602 and a server 604 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    determining a kernel size needed to compute a weighted average for an image effect on an image;
    defining a threshold kernel size;
    when the determined kernel size is at or below the threshold kernel size, sampling texels directly from the image; and
    when the determined kernel size is above the threshold kernel size, selecting at least one mipmap generated by a graphics processing unit (GPU) according to a function of the determined kernel size;
    sampling texels from the selected at least one mipmap using the GPU; and
    calculating the weighted average from the sampled texels.

2. The computer-implemented method of claim 1, wherein the threshold kernel size is a multiplier of a standard deviation for the image effect, wherein the multiplier is selected according to a precision and a performance for the image effect.

3. The computer-implemented method of claim 1, wherein selecting the at least one mipmap comprises:
    calculating the function of $L=\log_2$(kernel size/threshold kernel size);
    when L is an integer, selecting a mipmap level corresponding to L; and
    when L is not an integer:
        selecting a first mipmap level at floor(L) and an adjacent mipmap level at ceiling(L), using the GPU; and
        blending the first and adjacent mipmaps according to weights defined by the fractional component of L.

4. The computer-implemented method of claim 3, further comprising:
    sampling from the first and adjacent mipmap levels using a single GPU instruction.

5. The computer-implemented method of claim 1, further comprising:
    storing the weighted average to an output texture.

6. The computer-implemented method of claim 1, further comprising:
    performing a transition effect by performing the steps of claim 1 successively for at least two different kernel sizes.

7. The computer-implemented method of claim 1, further comprising: applying the image effect using the weighted average.

8. The computer-implemented method of claim 1, wherein the image effect is a Gaussian blur.

9. A storage memory unit containing instructions that if executed enable a system to:
    receive a threshold kernel size;
select at least one mipmap according to a function of a kernel size, the mipmap generated by a graphics processing unit (GPU) from an original image; and
    when the kernel size is at or below the threshold kernel size, sample texels directly from the original image;
    when the kernel size is above the threshold kernel size, request sample texels from the selected at least one mipmap from the GPU;
    calculate a weighted average of the sampled texels; and
    output the weighted average as an output texture.

10. The storage memory unit of claim 9, wherein the instructions to select at least one mipmap comprise instructions, that if executed, enable the system to:
    calculate the function of $L=\log_2$(kernel size/threshold kernel size);
    when L is an integer, select a mipmap level corresponding to L; and
    when L is not an integer:
        receive a first mipmap level at floor(L) and an adjacent mipmap level at ceiling(L) from the GPU; and
        blend the first and adjacent mipmaps according to weights defined by the fractional component of L.

11. The storage memory unit of claim 10, wherein the instructions that if executed enable the system to request sample texels from the selected at least one mipmap comprise:
a single GPU instruction to sample from the first and adjacent mipmap levels.

12. The storage memory unit of claim 9, wherein the instructions that if executed enable the system to calculate a weighted average of the sampled texels comprise instructions to calculate a Gaussian blur.

13. The storage memory unit of claim 12, wherein the threshold kernel size is a multiplier of a standard deviation for the Gaussian Blur, wherein the multiplier is selected according to a precision and a performance for the Gaussian Blur.

14. An apparatus, comprising:
a graphics processing unit (GPU) to generate mipmaps from an original image, to sample the mipmaps, and to blend the samples in a weighted average; and
a processing unit in communication with the GPU to determine a threshold kernel size for an image effect, select at least one mipmap according to a function of a kernel size, sample texels directly from the image when the kernel size is at or below the threshold kernel size; and when the kernel size is above the threshold kernel size, request a weighted average of sample texels from the selected at least one mipmap from the GPU, and generate the image effect using the weighted average.

15. The apparatus of claim 14, the processing unit to:
calculate the function of $L=\log_2$(kernel size/threshold kernel size);
when L is an integer, select a mipmap level corresponding to L; and
when L is not an integer:
request a first mipmap level at floor(L) and an adjacent mipmap level at ceiling(L) from the GPU; and
receive a blend of the first and adjacent mipmaps according to weights defined by the fractional component of L from the GPU.

16. The apparatus of claim 14, further comprising a computer-readable storage medium, and the processing unit to save the weighted average as an output texture on the computer-readable storage medium.

17. The apparatus of claim 14, further comprising a display, and the processing unit to output the image effect to the display.

* * * * *